United States Patent
Wang et al.

(10) Patent No.: US 11,454,415 B2
(45) Date of Patent: Sep. 27, 2022

(54) HYBRID ELECTROCALORIC HEAT PUMP SYSTEM

(71) Applicants: Carrier Corporation, Jupiter, FL (US); Jialong Wang, Shanghai (CN)

(72) Inventors: Jialong Wang, Shanghai (CN); Dongzhi Guo, Shanghai (CN); Subramanyaravi Annapragada, South Windsor, CT (US); Thomas D. Radcliff, Vernon, CT (US); Sheng Li, Shanghai (CN); Parmesh Verma, South Windsor, CT (US); Craig R. Walker, South Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 166 days.

(21) Appl. No.: 16/763,885

(22) PCT Filed: Nov. 23, 2017

(86) PCT No.: PCT/CN2017/112614
§ 371 (c)(1),
(2) Date: May 13, 2020

(87) PCT Pub. No.: WO2019/100288
PCT Pub. Date: May 31, 2019

(65) Prior Publication Data
US 2020/0348041 A1    Nov. 5, 2020

(51) Int. Cl.
*F24F 12/00* (2006.01)
*F25B 21/00* (2006.01)

(52) U.S. Cl.
CPC ............ *F24F 12/006* (2013.01); *F25B 21/00* (2013.01); *F25B 2321/001* (2013.01)

(58) Field of Classification Search
CPC ............... F24F 12/006; F24F 2012/007; F25B 2321/001; F25B 21/00; Y02B 30/56; Y02B 30/00
See application file for complete search history.

(56) References Cited

U.S. PATENT DOCUMENTS 3,024,007 A    3/1962    Gordon
3,820,713 A    6/1974    Demaray
(Continued)

FOREIGN PATENT DOCUMENTS

CN    2894262 Y    5/2007
CN    202675546 U    1/2013
(Continued)

OTHER PUBLICATIONS

European Search Report for Application No. 17933179.8; dated Nov. 11, 2021; 8 Pages.
(Continued)

*Primary Examiner* — Ana M Vazquez
(74) *Attorney, Agent, or Firm* — Cantor Colburn LLP

(57) ABSTRACT

A building heating or cooling system is disclosed that includes an air handling system having an air delivery flow path in fluid communication with a conditioned space in the building. The building heating or cooling system also includes an electrocaloric heating or cooling system that includes first and second electrocaloric modules. A first inlet receives air from the conditioned space or the air delivery flow path and directs it through the first or second electrocaloric module to a first outlet to the conditioned space or the air delivery flow path, and a second inlet that receives air from the conditioned space or the air delivery flow path and directs it through the first or second electrocaloric module to a second outlet to outside the conditioned space.

13 Claims, 3 Drawing Sheets

(56) References Cited

U.S. PATENT DOCUMENTS

| | | |
|---|---|---|
| 4,150,788 A | 4/1979 | Matsumoto et al. |
| 4,545,524 A | 10/1985 | Zelczer |
| 4,947,928 A | 8/1990 | Parker et al. |
| 5,778,147 A * | 7/1998 | Kim ............... F24F 13/06 |
| | | 62/176.2 |
| 7,392,661 B2 | 7/2008 | Alles |
| 9,353,964 B2 | 5/2016 | Kates |
| 9,540,111 B2 | 1/2017 | Dittmar et al. |
| 9,599,353 B2 | 3/2017 | Cur et al. |
| 2010/0242509 A1 | 9/2010 | Lifson et al. |
| 2017/0045258 A1 * | 2/2017 | Annapragada ........ F28D 17/04 |

FOREIGN PATENT DOCUMENTS

| | | |
|---|---|---|
| JP | 2013160459 A | 8/2013 |
| JP | 2013160460 A | 8/2013 |
| WO | 9010180 A1 | 9/1990 |
| WO | 0181837 A1 | 11/2001 |
| WO | 2016022091 A1 | 2/2016 |
| WO | 2019100288 A1 | 5/2019 |

OTHER PUBLICATIONS

Department of Energy: Office of Energy Efficiency & Renewable Energy, "High Efficiency Solid-State Heat Pump Module", obtained from: https://www.energy.gov/eere/buildings/downloads/high-efficiency-solid-state-heat-pump-module, on Apr. 21, 2020, 3 pages.

Gentry Heating Inc.: "What You Need to Know About Zoned HVAC Systems"; Feb. 12, 2014, Article, obtained from: https://www.gentryheatinginc.com/article/what-you-need-to-know-about-zoned-hvac-systems, on Apr. 21, 2020, 6 pages.

International Search Report for International Application No. PCT/CN2017/112614, Application Filing Date Nov. 23, 2017, dated Aug. 10, 2018, 6 pages.

Written Opinion for International Application No. PCT/CN2017/112614, Application Filing Date Nov. 23, 2017, dated Aug. 10, 2018, 5 pages.

* cited by examiner

HYBRID ELECTROCALORIC HEAT PUMP SYSTEM

CROSS REFERENCE TO RELATED APPLICATIONS

This application is a National Stage application of PCT/CN2017/112614, filed Nov. 23, 2017, which is incorporated by reference herein.

BACKGROUND

Exemplary embodiments described herein pertain to the field of heating, ventilation, and cooling.

A wide variety of technologies exist for heating and/or cooling applications. One of the most prevalent technologies in use for residential and commercial refrigeration and air conditioning is the vapor compression refrigerant heat transfer loop. These loops typically circulate a refrigerant having appropriate thermodynamic properties through a loop that comprises a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, many of the refrigerants can present environmental hazards such as ozone depleting potential (ODP) or global warming potential (GWP), or can be toxic or flammable. Additionally, vapor compression refrigerant loops can be impractical or disadvantageous in environments lacking a ready source of power sufficient to drive the mechanical compressor in the refrigerant loop.

Accordingly, there has been interest in developing alternative heat transfer technologies. Various technologies have been proposed such as field-active heat or electric current-responsive heat transfer systems relying on materials such as electrocaloric materials, magnetocaloric materials, or thermoelectric materials. However, many proposals have been configured as bench-scale demonstrations with limited practical applications.

BRIEF DESCRIPTION

Disclosed is a building heating or cooling system that includes an air handling system comprising an air delivery flow path in fluid communication with a conditioned space in the building. The building heating or cooling system also includes an electrocaloric heating or cooling system that includes first and second electrocaloric modules. A first inlet receives air from the conditioned space or the air delivery flow path and directs it through the first or second electrocaloric module to a first outlet to the conditioned space or the air delivery flow path, and a second inlet that receives air from the conditioned space or the air delivery flow path and directs it through the first or second electrocaloric module to a second outlet to outside the conditioned space.

In some embodiments, the building or heating cooling system further includes a controller configured to alternately energize and de-energize the first and second electrocaloric modules while alternating air flow through the first and second electrocaloric modules between first and second operational states. In the first operational state, the first module is energized and in fluid communication with the first inlet and first outlet, and the second module is de-energized and in fluid communication with the second inlet and second outlet. In the second operational state, the first module is de-energized and in fluid communication with the second inlet and second outlet, and the second module is energized and in fluid communication with the first inlet and first outlet.

In any one or combination of the foregoing embodiments, the first inlet receives air from the conditioned space and the first outlet discharges air to the air delivery flow path, and the second inlet receives air from the conditioned space and the second outlet discharges air to outside the conditioned space.

In any one or combination of the foregoing embodiments, the building heating or cooling system includes an air circulation flow path comprising the air delivery flow path and an air return flow path.

In any one or combination of the foregoing embodiments, the first inlet receives air from the conditioned space through the air return flow path.

In any one or combination of the foregoing embodiments, the second outlet discharges to outside of the building, to an unconditioned space inside the building, or to a second conditioned space inside the building.

In any one or combination of the foregoing embodiments, the building heating or cooling includes a controller configured to operate the electrocaloric module to heat or cool air received by the first inlet and discharged by the first outlet in response to a first heating/cooling demand signal.

In any one or combination of the foregoing embodiments, the air delivery flow path is in thermal communication with a heat source or heat sink to heat or cool air delivered by the air delivery flow path.

In any one or combination of the foregoing embodiments, the building heating or cooling includes a controller configured to heat or cool the air delivered by the air delivery flow path in response to a second heating/cooling demand signal.

In any one or combination of the foregoing embodiments, the second heating/cooling demand signal represents a primary building heating or cooling demand, and the first heating/cooling demand signal represents a local zone heating or cooling demand signal, a room heating or cooling demand signal, or a personal microclimate heating or cooling demand signal.

In any one or combination of the foregoing embodiments, the first heating/cooling demand signal represents a primary building heating or cooling demand, and the second heating/cooling demand signal represents a supplemental building heating or cooling demand.

In any one or combination of the foregoing embodiments, the building heating or cooling system includes a plurality of electrocaloric heating or cooling systems comprising said first and second electrocaloric modules, first inlets that receive air from the conditioned space or the air delivery flow path and direct it through the first or second electrocaloric module to a first outlet to the conditioned space or the air delivery flow path, and second inlets that receive air from the conditioned space or the air delivery flow path and direct it through the first or second electrocaloric module to a second outlet to outside the conditioned space.

In any one or combination of the foregoing embodiments, the building or heating cooling system includes a controller configured to selectively operate any one or combination of the plurality of electrocaloric heating or cooling systems in response to heating or cooling demand criteria.

In any one or combination of the foregoing embodiments, the building or heating cooling system includes an air blower that moves air along the air delivery flow path.

Also disclosed is a method of operating the system of any one or combination of the foregoing embodiments. The method comprises delivering air to the conditioned space from the air delivery flow path of claims 1-14, and alternately energizing and de-energizing the first and second electrocaloric modules while alternating air flow through the first and second electrocaloric modules between first and second operational states. In the first operational state, the first module is energized and in fluid communication with the first inlet and first outlet, and the second module is de-energized and in fluid communication with the second inlet and second outlet. In the second operational state, the first module is de-energized and in fluid communication with the second inlet and second outlet, and the second module is energized and in fluid communication with the first inlet and first outlet.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
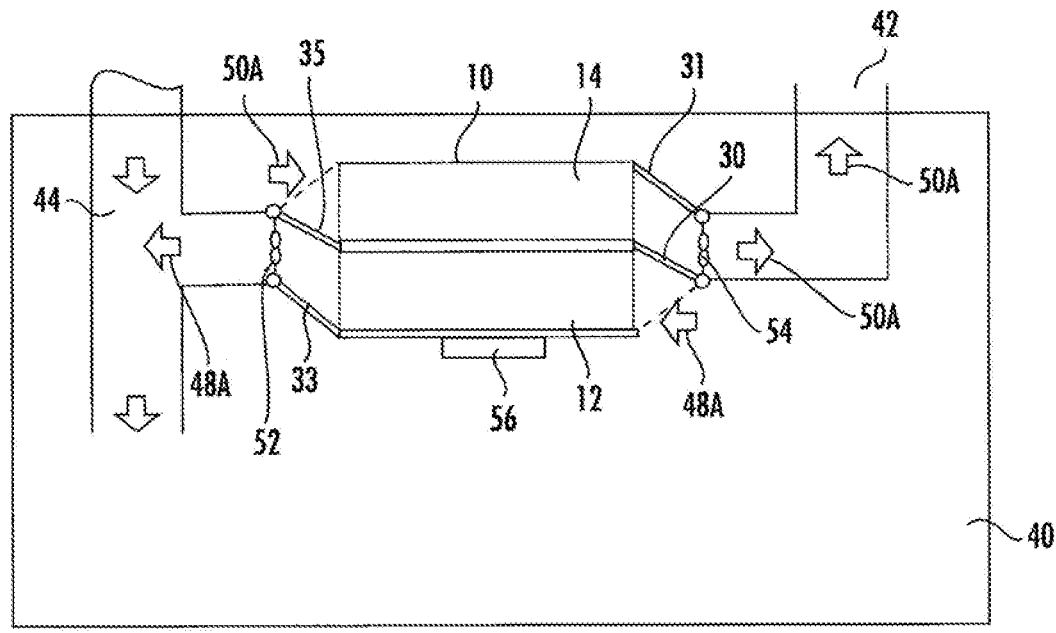
FIGS. 1A and 1B are schematic representations of an example embodiment in first and second operational states.

A detailed description of one or more embodiments of the disclosed apparatus and method are presented herein by way of exemplification and not limitation with reference to the Figures.

With reference now to FIGS. 1A, 1B, 2A, and 2B, there is shown a schematic depiction of an example embodiment of an electrocaloric heat transfer system 10/11 in two operational states A and B. As shown in the figures, the heat transfer system 10/11 comprises a first electrocaloric module 12 and a second electrocaloric module 14. Each of the first and second electrocaloric modules 12, 14 includes a stack of electrocaloric elements (not shown), e.g., electrocaloric films disposed between electrodes. Examples of electrocaloric materials for the electrocaloric film can include but are not limited to inorganic materials (e.g., ceramics), electrocaloric polymers, and polymer/ceramic composites. Examples of inorganics include but are not limited to $PbTiO_3$ ("PT"), $Pb(Mg_{1/3}Nb_{2/3})O_3$ ("PMN"), PMN-PT, $LiTaO_3$, barium strontium titanate (BST) or PZT (lead, zirconium, titanium, oxygen). Examples of electrocaloric polymers include, but are not limited to ferroelectric polymers (e.g., Polyvinylidene fluoride and copolymers containing repeat units derived from vinylidene fluoride and other halogenated or non-halogenated addition polymerizable comonomers), liquid crystal polymers, and liquid crystal elastomers. Electrodes on the electrocaloric film can take different forms with various electrically conductive components. In some embodiments, the electrodes can be in the form of metalized layers on each side of the film such as disclosed in published PCT application WO 2017/111921 A1, the disclosure of which is incorporated herein by reference in its entirety.

With continued reference to FIGS. 1A, 1B, 2A, and 2B, the first electrocaloric module 12 includes a first port 18 and a second port 20, with a fluid flow path between the first and second ports. In some embodiments, the fluid flow path between the first port 18 and the second port 20 can include flow channels such as disclosed in published PCT application WO 2017/111916 A1, the disclosure of which is incorporated herein by reference in its entirety, in which spacer structures between electrocaloric between adjacent electrocaloric films in a stack configuration extend parallel to the direction of fluid flow to provide channels for fluid flow. The second electrocaloric module 14 includes a third port 22 and a fourth port 24, with a fluid flow path between the third and fourth ports. In the example embodiment shown in FIGS. 1A and 1B, the first and second electrocaloric modules in electrocaloric heat transfer system 10 are each in controllable fluid communication with a conditioned space 40, an exhaust 42 to outside of the conditioned space (e.g., outside of the building, an unconditioned space inside of the building, or a second conditioned space inside the building such as where the primary conditioned space is a microclimate associated with the electrocaloric heat transfer system), and an air delivery flow path 44.

Figure 1B:
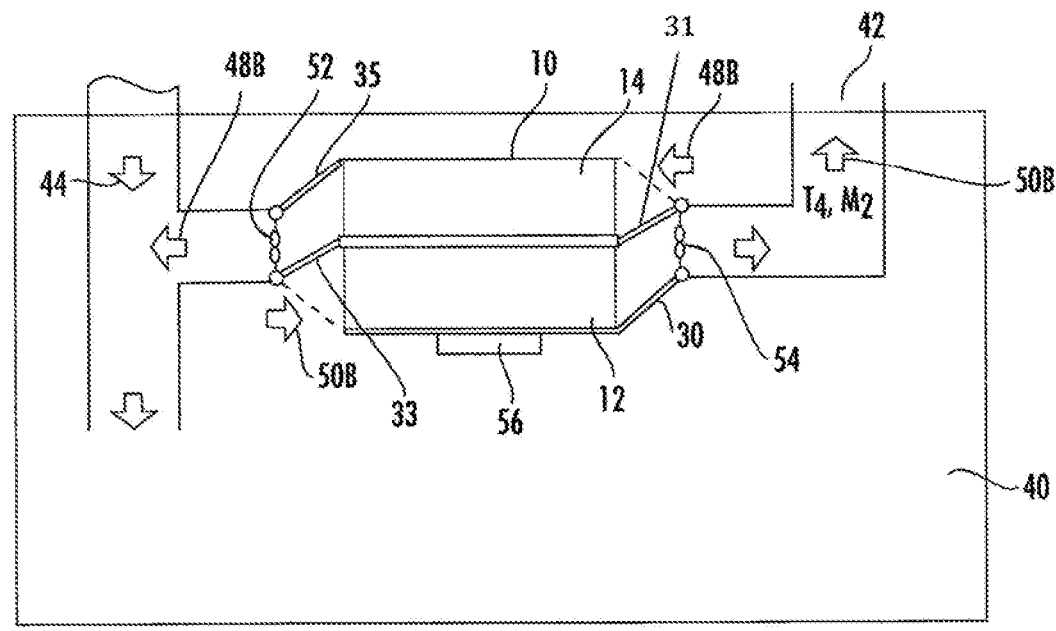
Figure 2A:
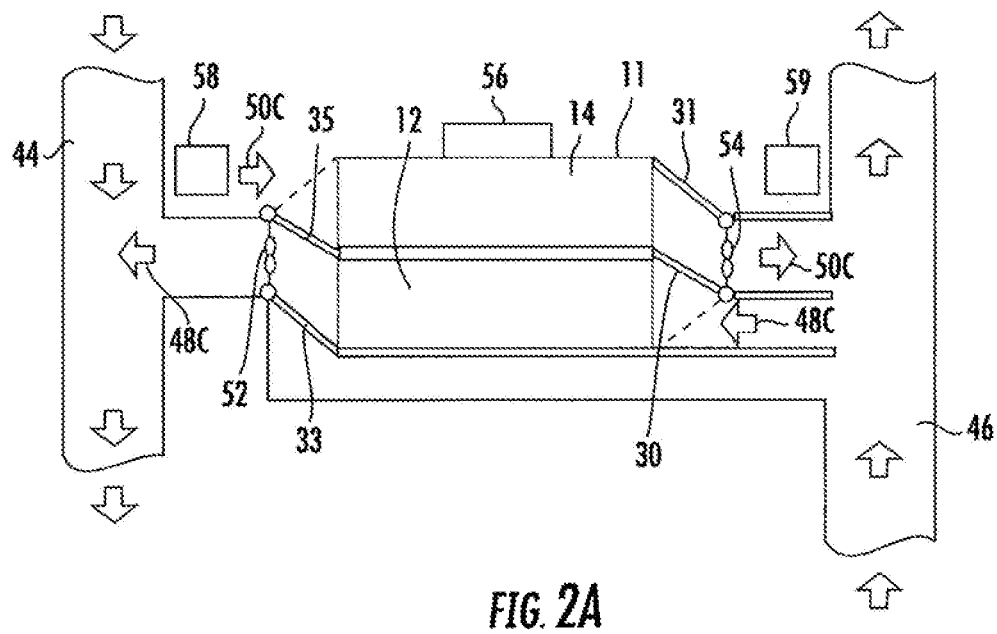
FIGS. 2A and 2B are schematic representations of another example embodiment in first and second operational states.
Figure 2B:
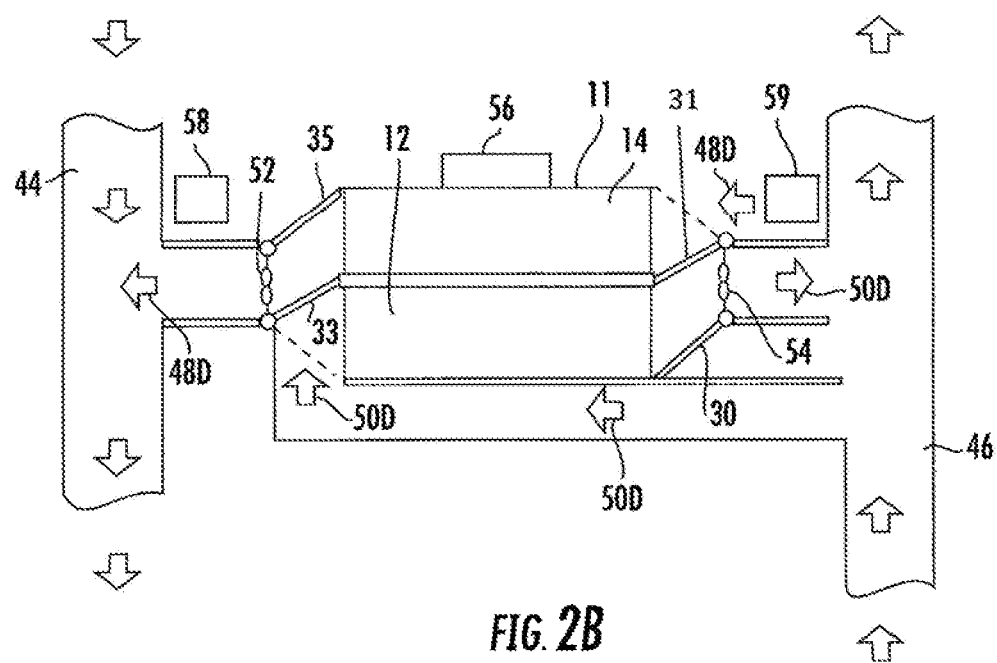

In the example embodiment shown in FIGS. 2A and 2B, the first and second electrocaloric modules in electrocaloric heat transfer system 11 are each in controllable fluid communication with an air delivery flow path 44 and an air return flow path 46. Airflow through the first and second modules 12/14 is controllably directed by doors 30, 31, 33, and 35, which can be moved between the positions shown in FIGS. 1A and 1B, or between the positions shown in FIGS. 2A and 2B. FIGS. 1A and 1B show two operational states, with a first operational state shown in FIG. 1A in which the doors 30, 31, 33, and 35 are positioned to provide a flow path 48A through the first module 12 between the conditioned space 40 and the delivery flow path 44, and a flow path 50A through the second module 14 between the conditioned space 40 and the exhaust 42. A second operational state is shown in FIG. 1B in which the doors 30, 31, 33, and 35 are positioned to provide a flow path 48B through the second module 14 between the conditioned space 40 and the delivery flow path 44, and a flow path 50B through the first module 12 between the conditioned space 40 and the exhaust 42. Blowers (e.g., a fan) 52 and 54 are positioned to provide motive force for flow along the flow paths 48A, 50A, 48B, and 50B, with blower 52 moving air from right to left (with respect to the view shown in the Figures) and blower 54 moving air from left to right (with respect to the view shown in the Figures).

In operation, a controller 56 (e.g., an electronic control unit) operates electrodes on the electrocaloric components, the doors 30, 31, 33, and 35, and the blowers 52 and 54 to operate the first and second electrocaloric modules 12, 14 out of sync in an internal heat regenerative mode, as described in more detail below. In this mode, one of the electrocaloric modules operates in a regeneration mode absorbing heat from the air on the module's flow path (flow path 48A/48B in cooling mode) with the electrodes de-energized, while the other electrocaloric module operates in an active mode transferring heat to the air on that module's flow path (flow path 50A/50B in cooling mode) with the electrodes energized. The system is operated such that each of the electrocaloric modules alternately shifts between regeneration mode and active mode, with synchronization of the fluid flow. Fluid flow is synchronized with the operational states to provide a back and forth flow pattern along the first, second, and third fluid flow paths so that each of the first and second modules provides a regeneration-enhanced temperature lift. The description below of operational modes is characterized for a cooling mode, but the skilled person will understand that the electrocaloric heat transfer system can work in a heating mode as well. In active mode, with the electrodes energized, the electrocaloric material experiences a decrease in entropy as molecules and/or atoms in the electrocaloric material reorient under the influence of the electric field, resulting in a complementary increase in enthalpy tending to increase the temperature of the electrocaloric material (under adiabatic conditions). In this mode, a working fluid such as air can be contacted with the electrocaloric material to absorb heat from the electrocaloric material (tending to reduce its temperature) and transport the heat to a heat sink such as an unconditioned space in the building or space outside of the building. In regeneration mode, with the electrodes de-energized, the electrocaloric material experiences an increase in entropy (and accompanying decrease in enthalpy) as molecules and/or atoms in the electrocaloric material are released from their strained orientation under the influence of the electric field. The electrocaloric material, having had heat removed by the working fluid during the active mode, undergoes a drop in temperature to provide cooling for a working fluid such as air to be cooled and delivered to a conditioned space.

With respect to the system shown in FIGS. 1A and 1B, FIG. 1A shows the system with the first module 12 in regenerative mode with the electric field de-energized and air from the conditioned space 40 flowing on flow path 48A through the first module 12 where it is cooled (in cooling mode), and then to the air delivery flow path 44 from which it is delivered to the conditioned space 40. Alternatively, the system could be configured for the flow path 48A to discharge air directly to the conditioned space 40. The second module 14 is in active mode with the electric field energized and air from the conditioned space 40 flowing on flow path 50A through the second module 14 where it is absorbs heat from the electrocaloric material, and then to the exhaust 42 to a heat sink such as the environment outside the building or an unconditioned space inside the building.

FIG. 1B shows the system with the second module 14 in regenerative mode with the electric field de-energized and air from the conditioned space 40 flowing on flow path 48B through the second module 14 where it is cooled (in cooling mode), and then to the air delivery flow path 44 from which it is delivered to the conditioned space 40. Alternatively, the system could be configured for the flow path 48B to discharge air directly to the conditioned space 40. The first module 12 is in active mode with the electric field energized and air from the conditioned space 40 flowing on flow path 50B through the first module 12 where it is absorbs heat from the electrocaloric material, and then to the exhaust 42 to a heat sink such as the environment outside the building or an unconditioned space inside the building. The skilled person will appreciate that the repositioning of the doors 30, 31, 33, 35 between FIGS. 1A and 1B (or between FIGS. 2A and 2B) and the reversal of airflow direction has the effect of repositioning the first and second inlets and outlets with respect to the electrocaloric modules as depicted in FIGS. 1A/1B and 2A/2B, as those inlets/outlets are identified by the space outside of the electrocaloric modules to which they are connected. The same effect could be provided by fixed position inlets/outlets in communication with the respective space outside of the electrocaloric modules, having controllable fluid communication flow paths (e.g., by diverter valves) with the desired module(s).

In FIGS. 2A and 2B, the system utilizes the air return flow path 46 as a heat sink. FIG. 2A shows the system with the first module 12 in regenerative mode with the electric field de-energized and air from the return flow path 46 flowing on flow path 48C through the first module 12 where it is cooled (in cooling mode), and then to the air delivery flow path 44 where mixes with and provides supplemental cooling to the air on the air deliver flow path 44. The second module 14 is in active mode with the electric field energized and air from return flow path port 58 (connected to the return flow path by a conduit (not shown)) flowing on flow path 50C through the second module 14 where it is absorbs heat from the electrocaloric material, and then to the return flow path 46 where it mixes with return air flow for cooling by a primary building cooling system.

FIG. 2B shows the system with the second module 14 in regenerative mode with the electric field de-energized and air from return flow path port 59 (connected to the return flow path by a conduit (not shown)) flowing on flow path 48D through the second module 14 where it is cooled (in cooling mode), and then to the air delivery flow path 44 where mixes with and provides supplemental cooling to the air on the air deliver flow path 44. The first module 12 is in active mode with the electric field energized and air from return flow path 46 flowing on flow path 50D through the first module 12 where it is absorbs heat from the electrocaloric material, and then to the return flow path 46 where it mixes with return air flow for cooling by a primary building cooling system.

As mentioned above, the embodiments depicted in FIGS. 1A/1B and FIGS. 2A/2B are example embodiments, and other configurations can be utilized. For example, each of the Figures depicts two electrocaloric modules 12 and 14; however, alternative configurations can utilize multiple electrocaloric modules in parallel or cascaded in series.

The electrocaloric system(s) can be operated in either cooling mode as described above, or in a heating or heat pump mode. In both modes, the electrocaloric modules are alternately cycled out of sync between an active mode where the electrodes are energized and a regeneration mode where the electrodes are de-energized.

In some embodiments, the electrocaloric modules 12, 14 can be operated in an internal regenerative mode. In an internal regenerative mode, only a portion of the total volume of working fluid in the flow path through the module is displaced during each cycle of the alternating cycles of activation and regeneration. This allows heat from the activation cycles retained by fluid internal to the flow path that was not displaced during the active cycle to provide heat to the electrocaloric material during the regenerative cycle. With repetition of cycles where each electrocaloric module experiences a back and forth partial displacement of fluid for each active/regenerative cycle, such internal regeneration can provide a significant temperature gradient (i.e., temperature lift) across the electrocaloric modules 12 and 14. System control to achieve a target temperature at the module inlet/outlet and/or a target temperature for conditioned air can be implemented in various ways, including but not limited to control of flow rates, cycle duration, or electric field strength.

Figure 3:
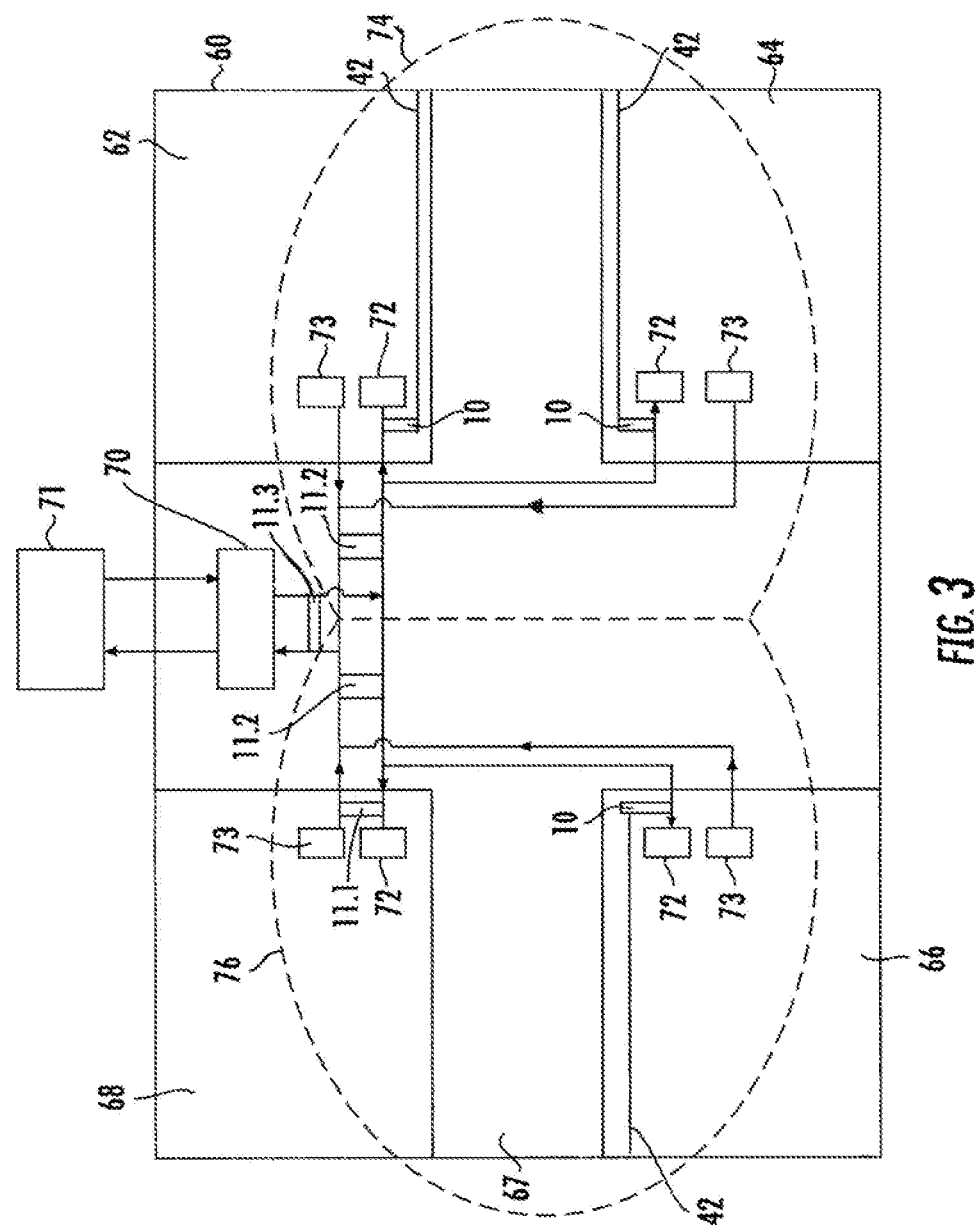
FIG. 3 is a schematic representation of an example embodiment of a system with electrocaloric modules disposed in rooms of a building, zones of an air handling system, and centrally disposed with the air handler.

As mentioned above, the above-described electrocaloric heating/cooling systems are incorporated into a building heating or cooling system. Electrocaloric modules in communication with the conditioned space such as the modules of FIGS. 1A/1B can be placed in individual rooms or other conditioned space areas of a building. Electrocaloric modules in communication with air delivery and air return flow paths can also be placed in individual rooms or other conditioned space areas of a building, and can also be integrated into a building air handling system in different zones of the air handling system or at higher levels such as at the air handler itself. An example embodiment of a building heating/cooling system comprising electrocaloric heating/cooling systems is in example configurations is schematically shown in FIG. 3. As shown in FIG. 3, a building 60 with rooms 62, 64, 66, and 68 at each corner of the building is equipped with an air handler 70 that circulates heated or cooled air through the building 60. The air handler can be equipped with one or more fans or blowers to move air on flow paths in the building 60, and can be in thermal communication with a heat sink or heat source such as a chiller 71; however, the system can also operate with the air handler delivering fresh air. The air handler moves air through an air distribution path represented by un-numbered lines emanating from the air handler 62 to supply diffusers 72 and return diffusers 73 located in the rooms of the building 60. The direction of arrows integrated with the flow path lines indicates whether it is a delivery path (arrow pointing away from the air handler 70 and toward the rooms) or a return path (arrow pointing toward the air handler 70 away from the rooms). It should be noted that although the electrocaloric system 10 configuration can be utilized with a cyclical air distribution flow using supply and return conduits as shown in FIG. 3 for rooms 62, 64, and 66 with the flow through the supply diffusers 72 balanced by the combined flow through return diffusers 73 and exhausts 42, a return flow path is not required for electrocaloric heat transfer system 10 configurations. Accordingly, a system utilizing such electrocaloric modular system 10 configurations can provide a non-cyclic supply with a distributed airflow through the building from the air handler 62 to supply diffusers 72 balanced only by the exhaust flow through the exhausts 42.

As the skilled person can appreciate from FIG. 3, the air flow path is organized as two zones 74 and 76, with zone 74 including rooms 62 and 64, and zone 76 including rooms 66 and 68. As further shown in FIG. 3, a number of electrocaloric heat transfer systems 10 or 11.X are connected to the air flow path at various locations in the building. Electrocaloric modular systems can be distributed in various hierarchical regimes of air handler system. As shown in FIG. 3, the electrocaloric heat transfer system 10 configurations are disposed in rooms of the building, but could also be disposed in any other conditioned spaces of the building where they can have access to a suitable exhaust to the outside or an unconditioned space. Electrocaloric heat transfer system 11 configurations are shown in operational communication with different hierarchical regimes of the air handler system, with electrocaloric heat transfer system 11.1 in operational communication with room 68, electrocaloric heat transfer systems 11.2 in operational communication at the zone level, with a system 11.2 in dedicated operational communication with each of zones 74 and 76, and electrocaloric heat transfer system 11.3 in operational communication with the air handler 70.

Control of the heating/cooling system such as shown in FIG. 3 can be provided by the individual electrocaloric heat transfer system controllers 56 and/or a centralized building controller (not shown). In a system with multiple controllers, they can be in communication over a network, and control responsibilities can be divided between the controllers or directed by a master controller. The electrocaloric heat transfer systems 10/11 can be activated by the controller(s) in response to various criteria. For example, in some embodiments selected electrocaloric heat transfer system(s) 10/11 associated with a room or other identified conditioned space (e.g., a microclimate within a larger conditioned area of the building) or with a zone can be activated in response to a heating/cooling demand signal associated with that room, space (e.g., microclimate), or zone (e.g., a thermostat reading in the room, space, or zone). In some embodiments, selected electrocaloric heat transfer system(s) 10/11 can be activated in response to a heating/cooling demand signal associated with the building heating/cooling system. In this mode, a building heating/cooling demand signal can be generated based on building thermal load, with electrocaloric heat transfer system(s) brought online as needed to manage the building thermal load. In some embodiments where the air handler 70 is thermally connected with a centralized heat source or heat sink such as chiller 71, the central heating/cooling provided to the building by the air handler 70 can be operated in response to a primary heating/cooling demand signal for the building, while the electrocaloric heat transfer systems 10/11 can be selectively activated in response to a supplemental building heating/cooling demand signal or in response to local heating/cooling demand signals for a respective room, other conditioned space, or zone.

The example embodiments described herein can provide beneficial technical effects. For example, in some embodiments, the centralized heating/cooling system need only deal with a base thermal load (with peak thermal loads being handled by the electrocaloric systems); therefore, the specified size of the centralized heating/cooling system can be reduced resulting in cost and efficiency savings. Similarly, since the centralized heating/cooling system need only deal with the base thermal load, the centralized system can be operated closer to its optimum design capacity so that it can operate more efficiently compared to a centralized system that has to be operated near peak capacity during peak load. Also, comfort and system responsiveness can be increased by providing local heating and cooling that is responsive to measured temperatures at the specified location. Additionally, the electrocaloric heat transfer systems themselves provide beneficial technical effects. For example, since the movement of the dampers is synchronized with the electric field switching, the electrocaloric systems can provide continuous heating or cooling while activated. Also, they can achieve high efficiency levels because they use air as the working fluid, thus avoiding the inefficiency involved in transferring heat between a refrigerant and the air being heated or cooled.

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A building heating or cooling system, comprising
an air handling system comprising an air delivery flow path in fluid communication with a conditioned space in the building;
an electrocaloric heating or cooling system comprising first and second electrocaloric modules, a first inlet that receives air from the conditioned space or the air delivery flow path and directs it through the first or second electrocaloric module to a first outlet to the conditioned space or the air delivery flow path, and a second inlet that receives air from the conditioned space or the air delivery flow path and directs it through the first or second electrocaloric module to a second outlet to outside the conditioned space; and
a controller configured to alternately energize and de-energize the first and second electrocaloric modules while alternating air flow through the first and second electrocaloric modules between a first operational state in which the first module is energized and in fluid communication with the first inlet and first outlet and the second module is de-energized and in fluid communication with the second inlet and second outlet, and a second operational state in which the first module is de-energized and in fluid communication with the second inlet and second outlet and the second module is energized and in fluid communication with the first inlet and first outlet,
wherein the first inlet receives air from the conditioned space and the first outlet discharges air to the air delivery flow path, and the second inlet receives air from the conditioned space and the second outlet discharges air to outside the conditioned space.

2. The system of claim 1, comprising an air circulation flow path comprising the air delivery flow path and an air return flow path.

3. The system of claim 2, wherein the first inlet receives air from the conditioned space through the air return flow path.

4. The system of claim 1, wherein the second outlet discharges to outside of the building, to an unconditioned space inside the building, or to a second conditioned space inside the building.

5. The system of claim 1, including a controller configured to operate the electrocaloric modules to heat or cool air received by the first inlet and discharged by the first outlet in response to a first heating/cooling demand signal.

6. The system of claim 1, wherein the air delivery flow path is in thermal communication with a heat source or heat sink to heat or cool air delivered by the air delivery flow path.

7. The system of claim 6, including a controller configured to heat or cool the air delivered by the air delivery flow path in response to a second heating/cooling demand signal.

8. The system of claim 7, wherein the second heating/cooling demand signal represents a primary building heating or cooling demand, and the first heating/cooling demand signal represents a local zone heating or cooling demand signal, a room heating or cooling demand signal, or a personal microclimate heating or cooling demand signal.

9. The system of claim 7, wherein the first heating/cooling demand signal represents a primary building heating or cooling demand, and the second heating/cooling demand signal represents a supplemental building heating or cooling demand.

10. The system of claim 1, comprising a plurality of electrocaloric heating or cooling systems comprising said first and second electrocaloric modules, first inlets that receive air from the conditioned space or the air delivery flow path and direct it through the first or second electrocaloric module to a first outlet to the conditioned space or the air delivery flow path, and second inlets that receive air from the conditioned space or the air delivery flow path and direct it through the first or second electrocaloric module to a second outlet to outside the conditioned space.

11. The system of claim 10, including a controller configured to selectively operate any one or combination of the plurality of electrocaloric heating or cooling systems in response to heating or cooling demand criteria.

12. The system of claim 1, further comprising an air blower that moves air along the air delivery flow path.

13. A method of operating the system of claim 1, comprising
delivering air to the conditioned space from the air delivery flow path; and
alternately energizing and de-energizing the first and second electrocaloric modules while alternating air flow through the first and second electrocaloric modules between a first operational state in which the first module is energized and in fluid communication with the first inlet and first outlet and the second module is de-energized and in fluid communication with the second inlet and second outlet, and a second operational state in which the first module is de-energized and in fluid communication with the second inlet and second outlet and the second module is energized and in fluid communication with the first inlet and first outlet.

* * * * *